United States Patent [19]

Markley

[11] 3,862,952

[45] Jan. 28, 1975

[54] METHOD FOR PREPARING 3,5,6-TRICHLORO-2-PYRIDYLOXYACETIC ACID

[75] Inventor: Lowell D. Markley, Midland, Mich.

[73] Assignee: The Dow Chemical Company, Midland, Mich.

[22] Filed: Aug. 30, 1973

[21] Appl. No.: 393,105

[52] U.S. Cl.............. 260/295 R, 260/294.9, 71/94
[51] Int. Cl............................................ C07d 31/36
[58] Field of Search ............................. 260/295 R

[56] References Cited
UNITED STATES PATENTS

| 3,609,158 | 9/1971 | Torba | 260/295 R |
| 3,755,339 | 8/1973 | McKendry | 260/295 R |

Primary Examiner—Alan L. Rotman
Attorney, Agent, or Firm—S. Preston Jones

[57] ABSTRACT

Method for preparing 3,5,6-trichloro-2-pyridyloxyacetic acid corresponding to the formula

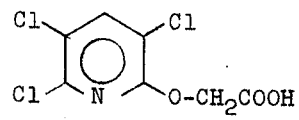

which comprises (a) reacting 2,3,5,6-tetrachloropyridine with paraformaldehyde and an alkali-metal cyanide in an anhydrous water-miscible inert aprotic organic solvent at a temperature of from about 15° to about 75°C. and (b) hydrolyzing the resulting 3,5,6-trichloro-2-pyridyloxyacetonitrile to the desired acid.

6 Claims, No Drawings

METHOD FOR PREPARING 3,5,6-TRICHLORO-2-PYRIDYLOXYACETIC ACID

BACKGROUND OF THE INVENTION

The preparation of 3,5,6-trichloro-2-pyridyloxyacetic acid is described by Cava, U.S. Dept. Com. Office Tech. Serv. P B Report, 150,125 (1957) and Cava, et al., J. Org. Chem., 23, 1614 (1958).

While 3,5,6-trichloro-2-pyridyloxyacetic acid is a well known herbicide, its use has not been extensive due to the unwieldy method for its preparation.

Cava and Cava, et al., teach the use of 6-chloro-2-pyridone as a starting material in the preparation of 3,5,6-trichloro-2-pyridyloxyacetic acid. While many methods of preparing 6-chloro-2-pyridone are known, Cava, et al., supra. and Cava, et al., J. Org. Chem., 23, 1287 (1958) employs a 7-step procedure starting with 6-amino-2-picoline (2-amino-6-methylpyridine). This procedure comprises (1) diazotization of 6-amino-2-picoline with nitrous acid in strong hydrochloric acid to produce 6-chloro-2-picoline; (2) sodium permanganate oxidation of the 6-chloro-2-picoline to give 6-chloro-2-picolinic acid; (3) esterification of the acid in methanol-anhydrous hydrogen chloride; (4) treatment of the resulting methyl ester in absolute ethanol with hydrazine to prepare 6-chloro-2-picolinic acid hydrazide; (5) conversion of the acid hydrazide to the corresponding azide with nitrous acid in dilute hydrochloric acid; followed by (6) treatment of the azide with aqueous acetic acid; and (7) diazotization of the resulting 6-chloro-2-aminopyridine with nitrous acid producing 6-chloro-2-pyridone.

The 3,5,6-trichloro-2-pyridyloxyacetic acid is thereafter prepared by treating the 6-chloro-2-pyridone in aqueous sulfuric acid to produce 3,5,6-trichloro-2-pyridone. The 3,5,6-trichloro-2-pyridone is heated with ethyl diazoacetate producing ethyl 3,5,6-trichloro-2-pyridyloxyacetate which is thereafter converted to 3,5,6-trichloro-2-pyridyloxyacetic acid by hydrolysis in aqueous sodium hydroxide followed by careful neutralization of the resulting sodium salt with the theoretical quantity of dilute sulfuric acid.

One of the principal reasons why the Cava and Cava, et al., methods have not met with much success is because of their apparent economic impracticability. For example, the overall yield of 6-chloro-2-pyridone from the 7-step procedure discussed hereinabove is only 11.7 percent of the theoretical. Similarly, 6-chloro-2-pyridone is converted into 3,5,6-trichloro-2-pyridyloxyacetic acid in only 17 percent yield. It is therefore a principal object of the present invention to provide a new economically feasible method whereby 3,5,6-trichlor-2-pyridyloxyacetic acid is obtained in high yield and in high purity.

SUMMARY OF THE INVENTION

The present invention is directed to a method for preparing 3,5,6-trichloro-2-pyridyloxyacetic acid corresponding to the formula

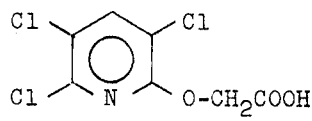

which comprises (a) reacting 2,3,5,6-tetrachloropyridine (hereinafter referred to as TETCP) with paraformaldehyde and an alkali-metal cyanide in a water-miscible inert aprotic solvent at a temperature of from about 15° to about 75°C. (TETCP-paraformaldehyde-cyanide reaction) and (b) converting the resulting 3,5,6-trichloro-2-pyridyloxyacetonitrile to the desired acid by aqueous acid hydrolysis.

Representative water-miscible inert aprotic solvents for carrying out the TETCP-paraformaldehyde-cyanide reaction include, for example, dimethyl sulfoxide (DMSO), N,N-dimethylformamide (DMF), acetonitrile, 1,2-dimethoxyethane (DME or glyme) and bis(2-methoxyethyl)ether (diglyme). These solvents should be anhydrous since aqueous solvents promote the formation of 3,5,6-trichloro-2-pyridinol, thereby decreasing the yield of the desired product.

Representative alkali-metal cyanides include, for example, sodium cyanide, potassium cyanide, cesium cyanide, lithium cyanide, and rubidium cyanide.

DETAILED DESCRIPTION OF THE INVENTION

In carrying out the method of the present invention a stirred solution of one (1) molar equivalent of TETCP in a water-miscible inert aprotic solvent is reacted with between about 1 to about 2 molar equivalents of paraformaldehyde and between about 1 to about 2 molar equivalents of sodium cyanide at a temperature of from about 15° to about 75°C. for a period of time from about 0.5 to 8 hours. The thus-formed 3,5,6-trichloro-2-pyridyloxyacetonitrile is isolated by adding water to the reaction mixture and extracting with methylene chloride. The organic layer is washed with water, dried over anhydrous sodium sulfate, and the solvent removed in vacuo leaving the crude product residue containing about 80 to about 85 percent nitrile. The molar equivalent ratio of TETCP:paraformaldehyde:cyanide used in the reaction can be larger than 1:2:2 but a larger molar ratio tends to cause breakdown of the nitrile to 3,5,6-trichloro-2-pyridinol.

The 3,5,6-trichloro-2-pyridyloxyacetonitrile is stable, and, if desired, can be purified by fractional distillation (boiling point 178°–183°C. at 15 millimeters of mercury) so as to insure high purity of the acid obtained by the subsequent aqueous acid hydrolysis of the nitrile.

The 3,5,6-trichloro-2-pyridyloxyacetonitrile is quantitatively converted to 3,5,6-trichloro-2-pyridyloxyacetic acid by heating the nitrile in either concentrated hydrochloric acid or 70 percent aqueous sulfuric acid at a temperature of from about 65° to about 70°C. for about 4 to 6 hours. Most of the acid product is insoluble in the hydrolysis medium and is isolated by filtration. The product is thereafter washed with water and dried.

In an alternate procedure to convert the nitrile into the free acid, the nitrile is agitated with concentrated hydrochloric acid at a temperature of from about 15° to about 30°C. for a period of time of from about 15 to about 20 hours and thereafter heating the mixture for an additional period of time ranging from about 4 to about 6 hours at a temperature of from about 65° to about 70°C. The crude acid product is isolated by filtration, washed with water, and dried.

The crude product can be purified, if desired, by slurrying it with carbon tetrachloride and recovering the relatively insoluble acid by filtration.

In an alternate purification procedure the crude product is admixed with solid sodium chloride and this mixture agitated with dilute hydrochloric acid, followed by hexane. After about 0.5 hour, the remaining solid is filtered, washed successively with portions of hexane and water, dried, slurried in hexane, filtered, washed with hexane, and dried.

The above reaction can be represented by the following reaction scheme:

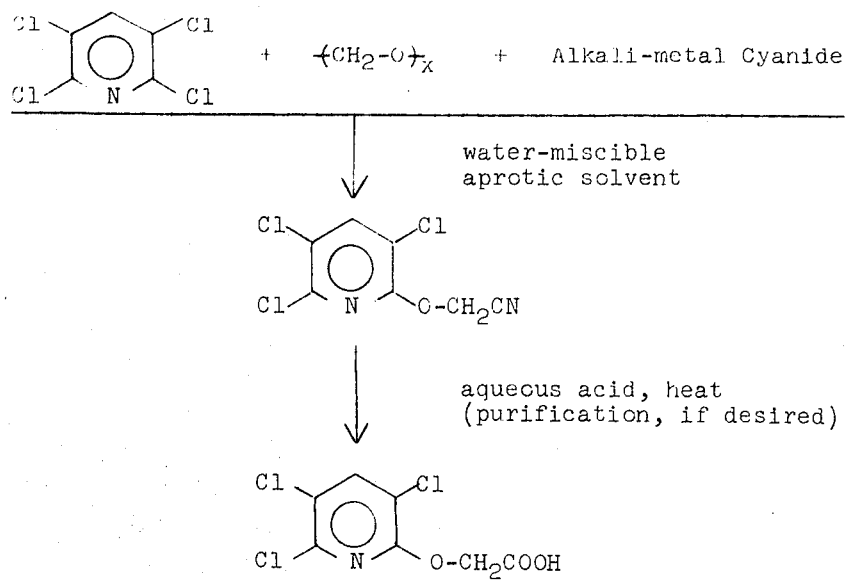

DESCRIPTION OF SOME PREFERRED EMBODIMENTS

The following examples illustrate the present invention and the manner by which it can be practiced but, as such, should not be construed as limitations upon the overall scope of the same.

EXAMPLE 1

3,5,6-Trichloro-2-pyridyloxyacetonitrile

Procedure A

To 21.7 grams (0.10 mole) of 2,3,5,6-tetrachloropyridine (TETCP) dissolved in 100 milliliters of dimethyl sulfoxide (DMSO) was added 3.3 grams (0.10 mole) 95 percent paraformaldehyde. To this slurry, at a temperature of about 25°C., was added 4.9 grams (0.10 mole) of sodium cyanide. The temperature was allowed to rise and reached 45°C. after 20 minutes of agitation with the disappearance of paraformaldehyde and formation of sodium chloride. After agitating 1.5 hours, the temperature had dropped to 30°C. and vapor phase chromatographic analysis of the reaction mixture showed 17 percent TETCP and 83 percent 3,5,6-trichloro-2-pyridyloxyacetonitrile. The nitrile product was isolated by adding 150 milliliters of water and extracting twice with 100-milliliter portions of methylene chloride. The organic layers were combined, washed with water, and dried over anhydrous sodium sulfate. The solvent was removed in vacuo leaving 21.6 grams of the 3,5,6-trichloro-2-pyridyloxyacetonitrile product residue.

Procedure B

To an agitated solution of 21.7 grams (0.10 mole) of TETCP dissolved in 100 milliliters of N,N-dimethylformamide (DMF) at about 24°C. was added 3.3 grams (0.10 mole) of 95 percent paraformaldehyde. To the resulting slurry was added 4.9 grams (0.10 mole) of sodium cyanide. The temperature was allowed to rise and reached 34°C. after 3 hours of agitation with the partial disappearance of paraformaldehyde and formation of a small amount of sodium chloride. The reaction mixture was thereafter placed in an oil bath preheated to about 58°-60°C. for about 3 hours. After allowing the reaction mixture to cool to room temperature the product nitrile was isolated using the procedure described in Procedure A hereinabove. The crude product residue contained 73 percent nitrile and 27 percent TETCP.

Procedure C

To an agitated solution of 21.7 grams (0.10 mole) of TETCP dissolved in 150 milliliters of acetonitrile at about 25°C. were added 3.3 grams (0.10 mole) of 95 percent paraformaldehyde and 4.9 grams (0.10 mole) of sodium cyanide. The resulting reaction mixture was placed in an oil bath and heated to an oil bath temperature of about 58°-60°C. for about 2 hours. The reaction mixture was allowed to cool to room temperature and the light tan solid precipitate present was recovered by distillation and washed with methylene chloride. The combined filtrate was washed consecutively with two 100 milliliter portions of 1.0 normal hydrochloric acid and two 150 milliliter portions of water. The remaining yellow solution was dried over anhydrous sodium sulfate and the solvent removed in vacuo leaving 22.0 grams of crude product residue which contained 52 percent of the nitrile and 48 percent of TETCP.

Procedure D

Following the procedures and conditions of Procedure C above, 21.7 grams (0.10 mole) of TETCP in 150 milliliters of acetonitrile was reacted with 5.0 grams (0.15 mole) of 95 percent paraformaldehyde and 7.5 grams (0.15 mole) of sodium cyanide for about 3 hours to give a yellow-tan product mixture. The nitrile product was isolated by adding 250 milliliters of methylene chloride and washing the product mixture with two 100-milliliter portions of 1.0 normal hydrochloric acid followed by two 150-milliliter portions of water. The organic (methylene chloride acetonitrile) layer was dried over anhydrous sodium sulfate and the solvent evaporated in vacuo leaving 22.6 grams of yellow oil which contained 72 percent nitrile and 28 percent TETCP.

Procedure E

To an agitated solution of 21.7 grams (0.10 mole) of TETCP in 100 milliliters of 1,2-dimethoxyethane (DME or glyme) at about 25°C. were added 3.3 grams (0.10 mole) of 95 percent paraformaldehyde and 5 grams (0.10 mole) of sodium cyanide. The reaction mixture was placed in an oil bath which had been preheated to about 63°-65°C. After about 6 hours reaction time had elapsed, the product mixture was allowed to cool to room temperature and the nitrile product was isolated using the procedure described in Procedure A hereinabove. The crude product residue contained 42 percent nitrile and 58 percent TETCP.

Procedure F

Following the procedures and conditions of Method E above, 21.7 grams (0.10 mole) of TETCP in 100 milliliters of bis(2-methoxyethyl)ether (diglyme) was reacted with 3.3 grams (0.10 mole) of 95 percent paraformaldehyde and 4.9 grams (0.10) of sodium cyanide for about 4.5 hours. The crude product mixture contained 58 percent nitrile and 42 percent TETCP.

EXAMPLE 2

3,5,6-Trichloro-2-pyridyloxyacetic acid

Procedure A

To 31.2 grams of 80 percent 3,5,6-trichloro-2-pyridyloxyacetonitrile (prepared as set forth hereinabove in Example 1) and 20 percent TETCP was added 200 milliliters of concentrated hydrochloric acid. The mixture was agitated at about 70°C. for about 6 hours and then allowed to cool. The white solid was filtered, washed with water, and dried to yield 30.7 grams of solid which consisted of 83 percent 3,5,6-trichloro-2-pyridyloxyacetic acid and 17 percent TETCP. The crude product (30.7 grams) was slurried in 100 milliliters of carbon tetrachloride, agitated for about 0.5 hour, and filtered to give 20.3 grams of 97 percent pure 3,5,6-trichloro-2-pyridyloxyacetic acid.

In an alternate purification procedure 25.0 grams of the crude product is admixed with 10.0 grams of solid sodium chloride. To this mixture is added, with agitation, 100 milliliters of water and 100 milliliters of concentrated hydrochloric acid (or 200 milliliters of 6 normal hydrochloric acid), followed by 150 milliliters of hexane. After about 0.5 hour the solid remaining was filtered, washed successively with 50 milliliters of hexane and 100 milliliters of water, and dried. The crystalline solid was thereafter slurried in 100 milliliters of hexane for about 20 minutes, filtered, washed with 75 milliliters of hexane, and dried to give 21.9 grams of pure hydrated 3,5,6-trichloro-2-pyridyloxyacetic acid.

Procedure B

To 31.2 grams of 80 percent 3,5,6-trichloro-2-pyridyloxyacetonitrile and 20 percent TETCP was added 200 milliliters of concentrated hydrochloric acid. The reaction mixture was stirred at about 25°C. for about 18 hours. The white flocculent solid present was filtered and washed twice with two 100-milliliter portions of water, once with a 200-milliliter portion of water, and finally dried. The solid product, 3,5,6-trichloro-2-pyridyloxyacetamide, was placed in 200 milliliters of concentrated hydrochloric acid and the reaction mixture was heated with agitation in an oil bath at about 70°C. for about 6 hours. After the reaction mixture had cooled to room temperature the white solid was filtered, washed with two 100-milliliter portions of water, and air dried to yield 30.7 grams of crude product which consisted of 83 percent 3,5,6-trichloro-2-pyridyloxyacetic acid and 17 percent TETCP.

Procedure C

To a solution of 70.0 grams of concentrated sulfuric acid and 30 milliliters of water cooled to room temperature was added 2.4 grams of 3,5,6-trichloro-2-pyridyloxyacetonitrile. The reaction mixture was heated in an oil bath at a bath temperature of about 65°-68°C. for about 4 hours. Upon cooling to room temperature, the reaction mixture was diluted with 100 milliliters of water and the white solid present was filtered, washed with approximately 50 milliliters of water, and dried at about 80°C. for about 1 hour. There remained 2.2 grams (85 percent) yield of 3,5,6-trichloro-2-pyridyloxyacetic acid, isolated as a white crystalline solid.

The results of the TETCP-paraformaldehyde cyanide reaction of the method of the present invention are set forth in the following table.

Table 1

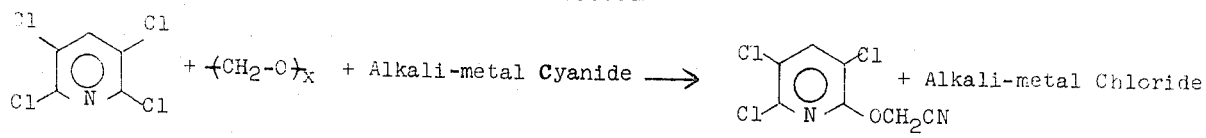

| Solvent | Reaction Temp.°C. | Reaction Time Hrs. | Percent Conversion[a] |
|---|---|---|---|
| DMSO | ambient (25) | 1.5 | 83 |
| DMF | 58–60 | 3.0 | 73 |
| CH$_3$CN | 58–60 | 2.0 | 52 |
| CH$_3$CN | 58–60 | 3.0 | 70[b] |
| CH$_3$OCH$_2$CH$_2$OCH$_3$ (DME or Glyme) | 58–60 | 6.0 | 43 |
| (CH$_3$OCH$_2$CH$_2$)$_2$O (Diglyme) | 58–60 | 4.5 | 58 |

[a] The ratio of reagents used was in all runs except that footnoted as b was 1:1:1.
[b] In this run, 1 eq. of TETCP was used and 1.5 eq. of both paraformaldehyde and sodium cyanide.

What is claimed is:

1. A method for preparing 3,5,6-trichloro-2-pyridyloxyacetic acid which comprises (a) reacting 2,3,5,6-tetrachloropyridine with paraformaldehyde and an alkali-metal cyanide in an anhydrous water-miscible inert aprotic organic solvent at a temperature of from about 15° to about 75°C. and (b) converting the resulting 3,5,6-trichloro-2-pyridyloxyacetonitrile to the desired acid by aqueous acid hydrolysis and recovering the thus-formed 3,5,6-trichloro-2-pyridyloxyacetic acid.

2. The method of claim 1 wherein the anhydrous water-miscible inert aprotic solvent is dimethyl sulfoxide.

3. The method of claim 1 wherein the anhydrous water-miscible inert aprotic solvent is N,N-dimethylformamide.

4. The method of claim 1 wherein the anhydrous water-miscible inert aprotic solvent is acetonitrile.

5. The method of claim 1 wherein the anhydrous water-miscible inert aprotic solvent is 1,2-dimethoxyethane.

6. The method of claim 1 wherein the anhydrous water-miscible inert aprotic solvent is bis(2-methoxyethyl)ether.

* * * * *